US007121598B2

(12) United States Patent
Pourtier et al.

(10) Patent No.: US 7,121,598 B2

(45) Date of Patent: Oct. 17, 2006

(54) POLE FOR REMOTE OPERATION OF A HAND TOOL

(75) Inventors: Fabrice Pourtier, Portes les Valence (FR); Patrick Herelier, Saint Jean de Muzols (FR)

(73) Assignee: Societe de Prospection et d'Inventions Techniques SPIT, Bourg-les-Valence (FR)

(*) Notice: Subject to any disclaimer, the term of this patent is extended or adjusted under 35 U.S.C. 154(b) by 97 days.

(21) Appl. No.: 10/859,594

(22) Filed: Jun. 3, 2004

(65) Prior Publication Data

US 2005/0000713 A1 Jan. 6, 2005

(30) Foreign Application Priority Data

Jun. 5, 2003 (FR) .................................. 03 06799

(51) Int. Cl.
*B25J 1/04* (2006.01)

(52) U.S. Cl. ....................................... 294/19.1; 81/487

(58) Field of Classification Search ............... 294/19.1, 294/22, 23, 24; 81/487, 177.2; 403/377
See application file for complete search history.

(56) References Cited

U.S. PATENT DOCUMENTS

| | | | | |
|---|---|---|---|---|
| 1,531,567 | A * | 3/1925 | Niblock | 81/3.8 |
| 3,229,859 | A * | 1/1966 | Conroy et al. | 222/174 |
| 3,264,809 | A * | 8/1966 | Jackson | 56/400.12 |
| 3,485,206 | A * | 12/1969 | Smrt | 118/305 |
| 4,147,220 | A * | 4/1979 | Swiderski et al. | 173/170 |
| 4,153,193 | A | 5/1979 | Urbanowicz | |
| 4,479,599 | A * | 10/1984 | Conrad | 227/9 |
| 4,655,380 | A | 4/1987 | Haytayan | |
| 4,930,824 | A * | 6/1990 | Matthews et al. | 294/19.1 |
| 5,096,244 | A * | 3/1992 | Wilson et al. | 294/19.1 |
| 5,135,388 | A | 8/1992 | Pettit | |
| 5,463,918 | A | 11/1995 | Lemieux et al. | |
| 5,598,892 | A | 2/1997 | Fox | |
| 6,357,809 | B1 * | 3/2002 | Gregoire, Sr. | 294/19.1 |
| 6,488,511 | B1 | 12/2002 | Stewart | |

* cited by examiner

*Primary Examiner*—Dean J. Kramer
(74) *Attorney, Agent, or Firm*—Lowe Hauptman & Berner, LLP

(57) ABSTRACT

A pole has, at one end, a tool-securing device, a linkage for operating the tool, a sleeve for operating the tool which is designed to slide along the pole, and an arrangement for securing the operating sleeve to the linkage which runs inside a tubular element. The operating sleeve comprises a securing wedge that lies through a window formed in the tubular element and through which the linkage runs.

15 Claims, 6 Drawing Sheets

POLE FOR REMOTE OPERATION OF A HAND TOOL

The field of the invention of this application is that of the placement of fasteners of the nail or staple type using a manually operated tool, but into a support material remote from the operator and inaccessible to his tool, even held at arm's length.

The support material mentioned here is, for example, that of a ceiling.

The hand-operated tool mentioned here also is of the kind of apparatus of the indirectly fired type for driving fasteners, with a piston propelled forward under the action of the combustion of a powder charge or of the explosion of a mixture of inflammable gases, to drive a fastener.

The purpose of the invention is to avoid the operator having to get up on a chair, a stool, or some other form of stepladder, in order to be able to operate his tool under good conditions of stability and of attitude.

In the case of an indirectly fired apparatus, "operate" is to be understood as meaning operating the trigger of the apparatus.

Thus, the invention relates to a pole for remote operation of a hand tool comprising, at one end, tool-securing means, a linkage for operating the tool, a sleeve for operating the tool, designed to slide along the pole, and means for securing the operating sleeve to the linkage.

In the preferred embodiment of the pole of the invention, the pole comprises at least one tubular element in which the linkage runs and the operating sleeve comprises a securing wedge that lies through a window formed in the tubular element and through which the linkage runs.

Also as a preference, the securing wedge is mounted to pivot on the operating sleeve under the action of means for returning this wedge to a wedging position on the linkage.

Again as a preference, the pole of the invention is telescopic and comprises at least two tubular elements pushed one inside the other, the tool-securing means being provided on the inner tubular element and the operating sleeve on the outer tubular element.

In this case, sleeves for locking the relative position of the two tubular elements may be provided.

It may then be beneficial for a first locking sleeve to be secured on the outer tubular element at one of its ends and to run along the inner tubular element to its other end which is arranged in order, by screwing and a wedging effect with a second sleeve arranged around the inner tubular element to be clamped against the inner tubular element and thus hold the two tubular elements in position.

Advantageously too, the securing end of the operating pole is tubular, a sheath to accommodate the linkage is pushed into the tubular end of the pole from one end and a tool-securing sleeve is pushed onto the tubular end of the pole, the tubular end of the pole, the sheath and the securing sleeve being secured together so that they rotate as one.

Advantageously, the other end of the sheath is designed to collaborate with a hub secured to braces for standing the tool off in order, using a retaining yoke, to create an antagonistic effect on the said tool and thus immobilize the tool.

The invention will be better understood with the aid of the following description of a preferred embodiment of the remote operation pole according to the invention, with reference to the attached drawing in which.

Figure 1:
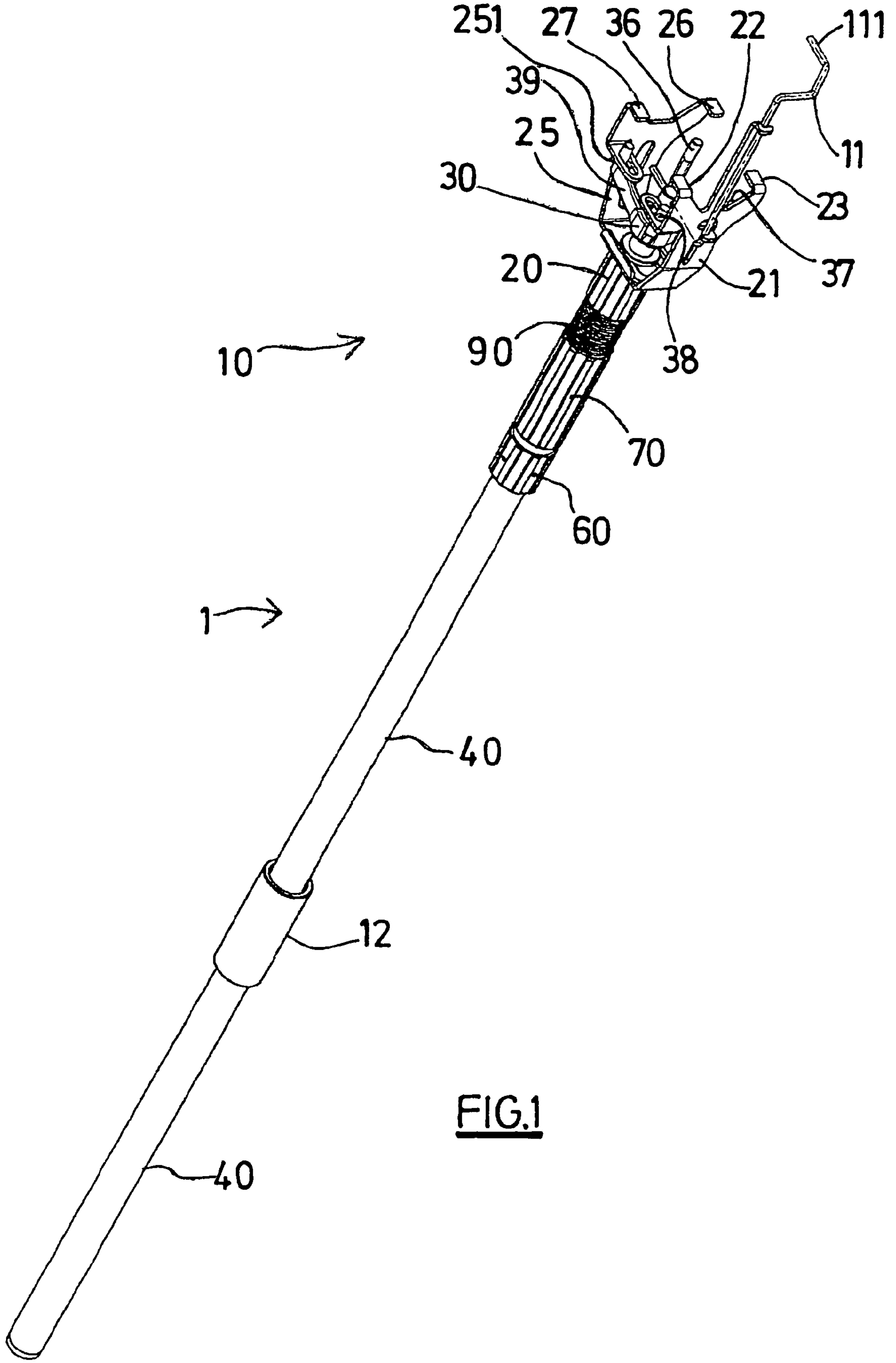
FIG. 1 depicts a perspective view of the entirety of the remote operation pole alone.
Figure 6:
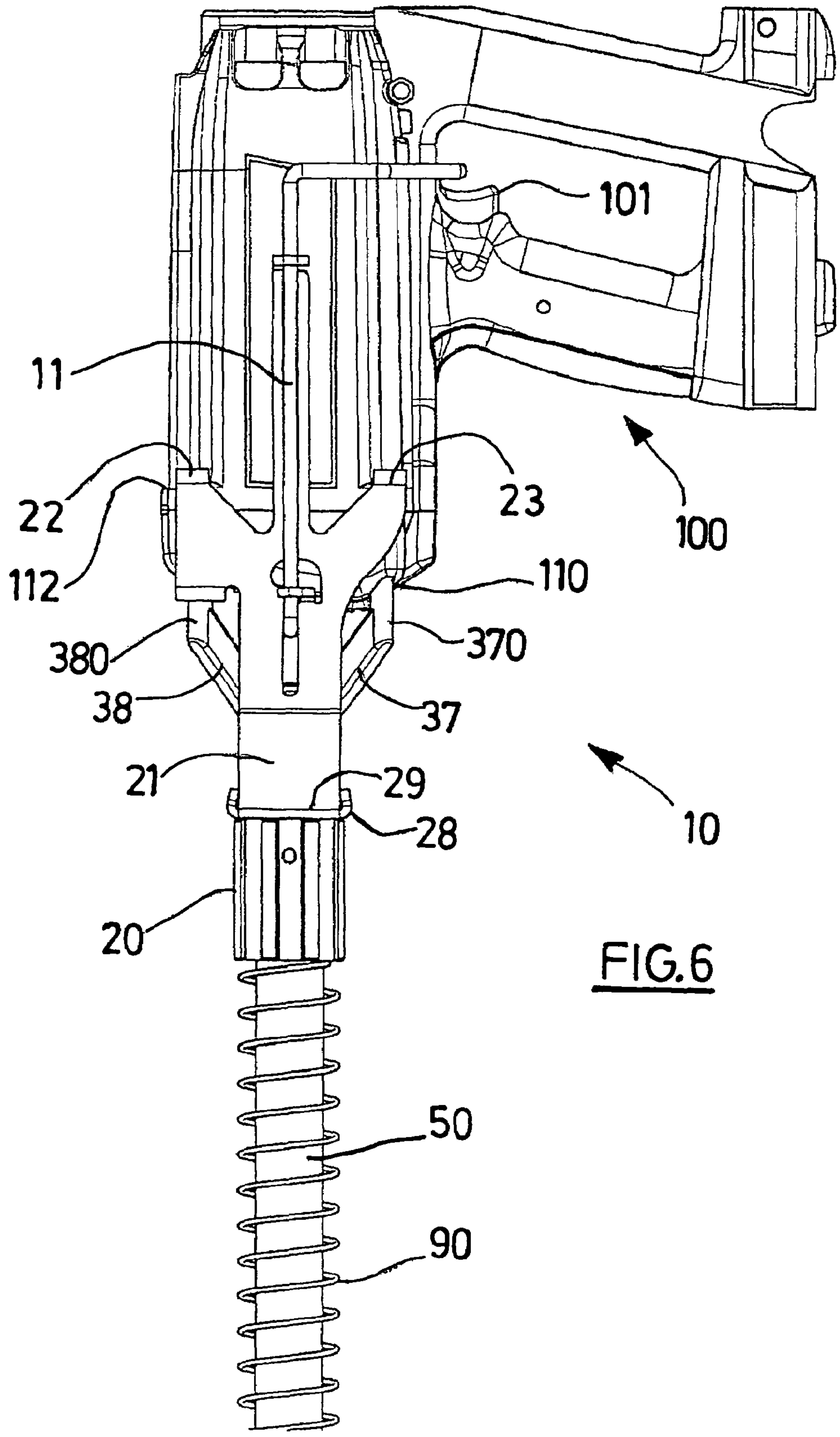
FIG. 6 is a side view of the securing end of the operating pole and the tool secured to it, the linkage being in the rest position.
Figure 7:
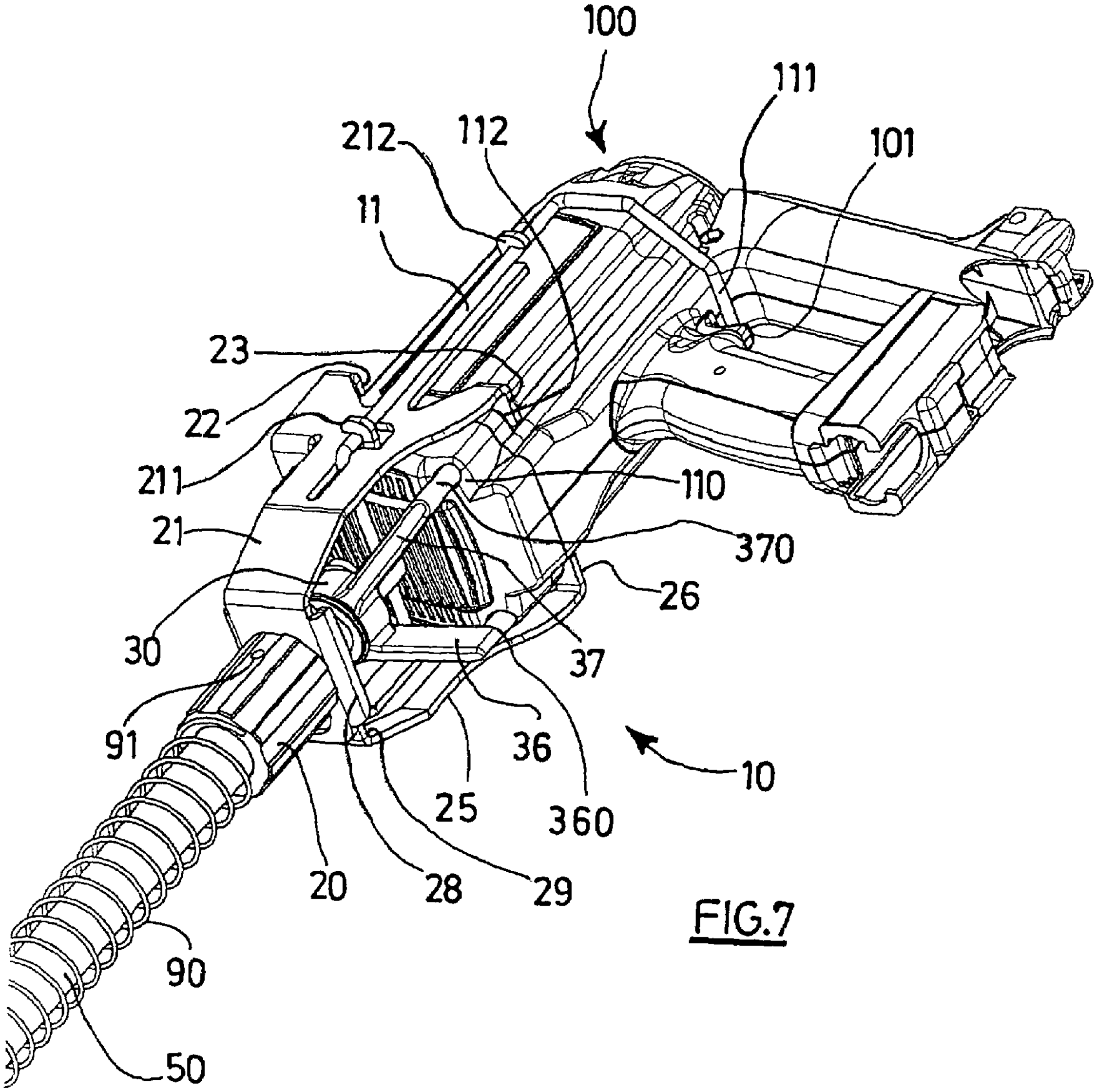
FIG. 7 is a perspective view of the same end and the tool secured to it, in the operating position.

With reference to FIG. 1, the remote operation pole comprises a hollow cylindrical tubular element 40, a linkage 11 running along inside the tubular element 40 and, at the end 10 of the pole 1, means for securing the tool 100 that is to be remotely operated (FIGS. 6 and 7). An operating sleeve 12, secured to the linkage 11 when the tool is operated remotely, slides along the said tubular element 40 and allows the trigger 101 of the tool 100 to be operated via the end 111 of the linkage 11.

The tool-securing means are made up of a yoke in two parts 21 and 25, pressing against a securing sleeve 20 secured to the end 10 of the pole, each part being equipped with two claws 22, 23 and 26, 27 designed to hold the tool under the antagonistic action of a thrust standing it off from the end 10, exerted by stand-off braces 36, 37, 38, 39 mounted on a hub 30 as explained later on.

Figure 2A:
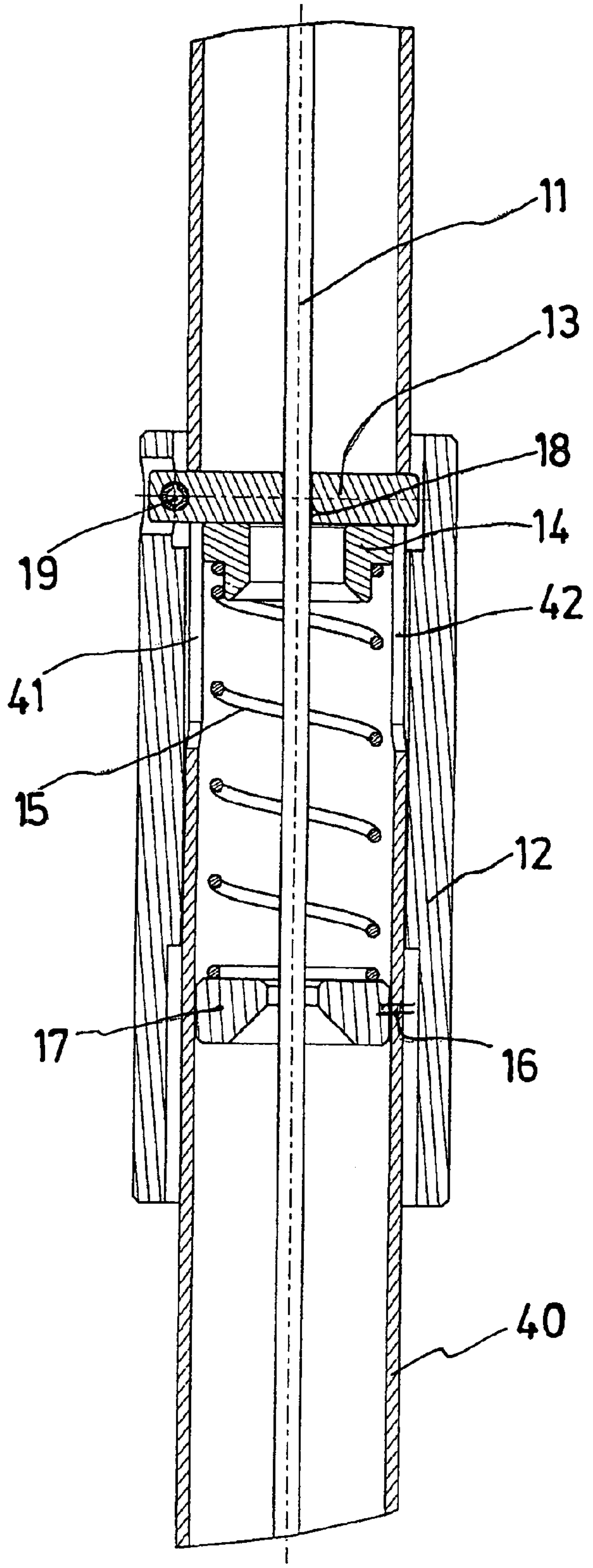
FIG. 2A is a view in longitudinal section of the tool operating sleeve in the rest position.
Figure 3:
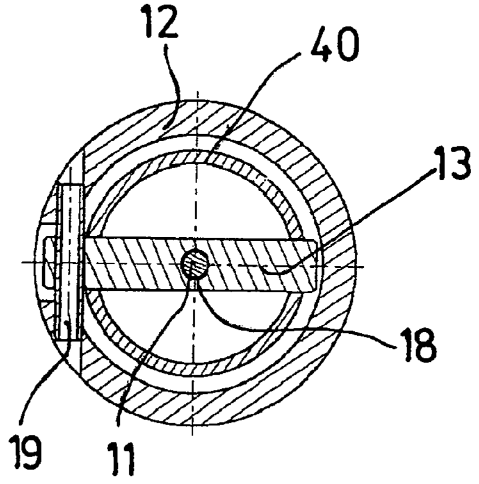
FIG. 3 is a view in cross section of the operating sleeve in the rest position.
Figure 2B:
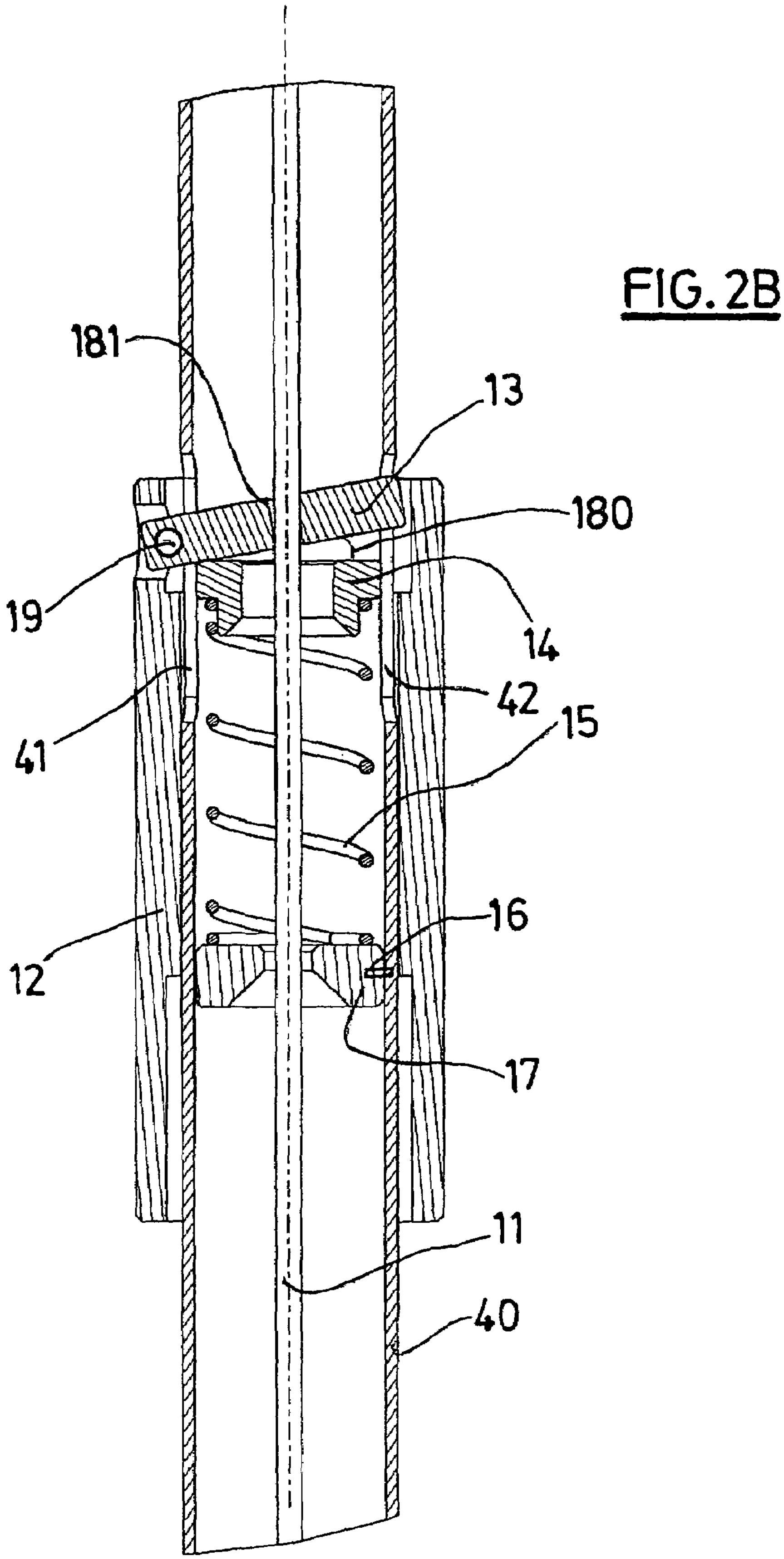
FIG. 2B is a view in longitudinal section of the operating sleeve while the tool is being operated.

The operating sleeve 12, with reference to FIGS. 2A, 2B, 3, comprises a securing wedge 13 for securing it to the linkage 11. The said wedge, of overall parallelepipedal shape, is mounted to pivot about an axle 19 provided in the sleeve 12. For this purpose, the wedge lies through two windows 41, 42 formed in the tubular element 40, these being more or less symmetric with respect to the axis of the sleeve 12, of a length more or less equal to the travel of the sleeve 12 on the tube 40. The wedge is pierced with an orifice 18, in this instance cylindrical, allowing the linkage 11 to pass with clearance. The clearance allows the wedge to pivot, but through an angle 180 limited by its most widely spaced opposed edges 181. Because the wedge lies in two opposed windows of the tubular element 40, any troublesome bracing effect when the pole length is being adjusted is avoided.

A piston 14, pushed by a spring 15 bearing against a ring 17 is pressed with some degree of firmness, or not pressed at all, against the wedge 13, the ring 17 being secured to the tubular element 40, in this instance by means of a pin 16.

While in FIG. 2A, the wedge 13 is not inclined by the angle 180 and the linkage is therefore free to slide in the orifice 18, in FIG. 2B, the operating sleeve 12 can be urged manually downwards, compressing the spring 15, such that, under the action of the spring 15 and the piston 14, the wedge 13 pivots and wedges the linkage via the edges 181 of its orifice 18, thus securing it to the sleeve 12. Conversely, the sleeve 12 is returned upwards by a device explained later on.

The remote operation pole is designed to be telescopic and to comprise another tubular element 50, here an inner one, sliding in the outer tubular element 40, and able to be secured to it according to the desired length of nesting.

As the ring 17 and the piston 14 leave a free passage for the linkage 11, which linkage is designed to be long enough, the linkage 11 can be secured to the operating sleeve 12 at a region of the said linkage that corresponds to this length of nesting.

Figure 4:
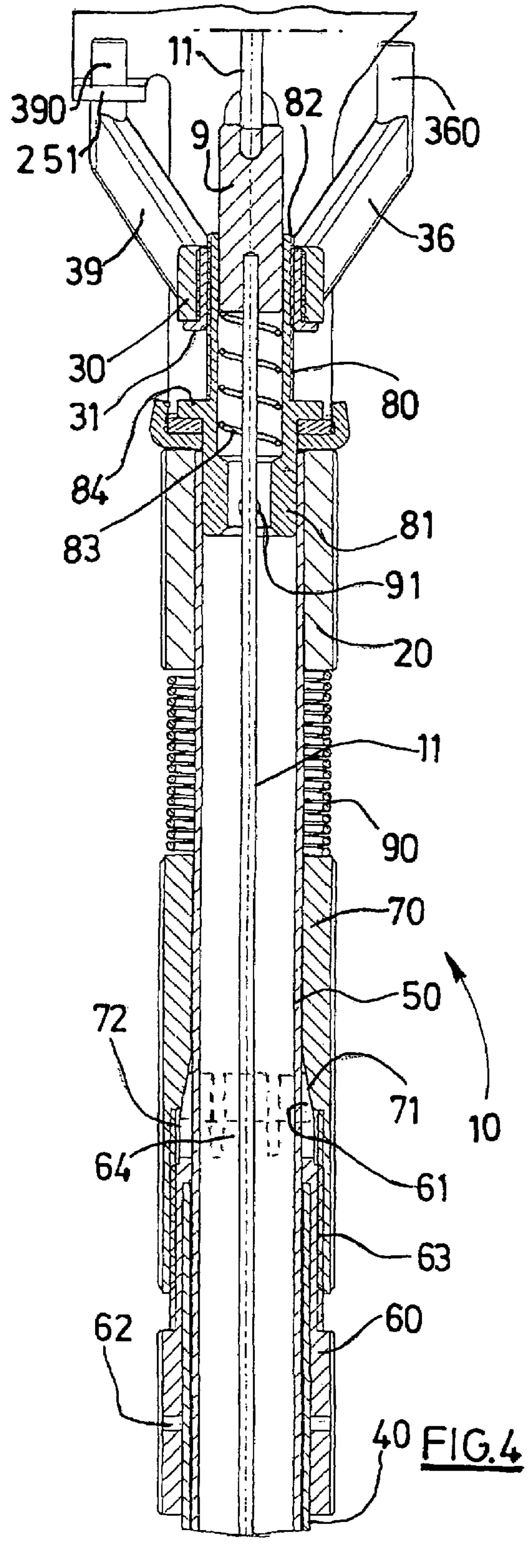
FIG. 4 is a partial longitudinal sectional view of the tubular elements of the pole of the invention equipped with their locking sleeves.

In order to adjust the desired length of nesting, with reference to FIG. 4, the outer tubular element 40 comprises a locking sleeve 60 secured to it at its end furthest from the end 10 of the pole, by a pin 62, and the inner tubular element 50 comprises a locking sleeve 70 mounted to slide along the tubular element 50.

The locking sleeves 60 and 70 collaborate to secure the tubular elements 40 and 50 together at any region on the tubular element 50, in the following way:

- the locking sleeve 70 comprises a tapped axial bore 72 that can be screwed onto a threaded external cylindrical part 63 of the locking sleeve 60,
- the locking sleeve 70 comprises an axial tapered bore 71 before the tapped bore 72 and the locking sleeve 60 comprises, beyond its threaded external cylindrical part 63, a split skirt 64 extending along the inner tubular element 50 and ending in a tapered surface designed to match the tapered bore 71 of the sleeve 70, having a certain elasticity and thus affording a wedge effect,
- when the locking sleeve 70 is screwed onto the locking sleeve 60 at the chosen point along the tubular element 50, the securing tabs of the skirt 64, between the slits, are clamped onto the said tubular element by the tapered bore 71 and this, through a wedging effect, secures the inner tubular element 50 to the locking sleeve 60 and therefore to the outer tubular element 40 in a relative position with respect to the latter.

Around the tubular element 50 a protective spring 90 is inserted between the locking sleeve 70 and the securing sleeve 20, so that as the tabs of the skirt 64 are relaxed, the said sleeves do not come sharply into contact with one another and risk injuring the user.

Figure 5:
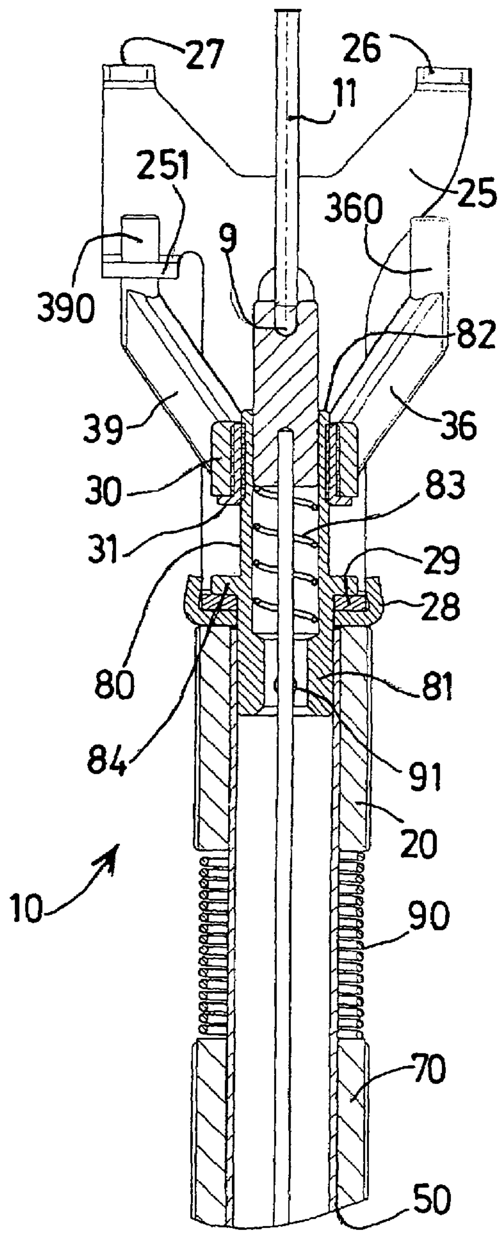
FIG. 5 is a view in longitudinal section of the tool-securing means.

The means for securing the tool 100 to the end 10 of the pole 1 will now be explained with reference to FIGS. 5 and 6.

The securing sleeve 20 is secured to the upper end of the inner tubular element 50, which is the end 10 of the pole, and into which the end 81 of a sheath 80 to accommodate the linkage 11 is pushed. The tubular end of the pole (the inner tube 50), the sheath 80 and the securing sleeve 20 are secured together by a pin 91.

The other end 82 of the sheath 80 has a thread onto which the locking ring 31 of a hub 30 is screwed, the tapping in the ring being a "left-hand" thread. The hub 30 is secured to stand-off braces, four of them in the example considered here, numbered 36, 37, 38, 39, uniformly arranged and having at their free end cylindrical fingers 360, 370, 380, 390 designed to be able to be pressed against surfaces 110 of the rear structure of the tool 100.

In its central region, the sheath 80 comprises a flange 84 designed to collaborate with the securing sleeve 20 to hold a yoke comprising two parts, one male 25 and one female 21, that are separable but designed to fit together via male 29 and female 28 soles when they are fitted between the flange 84 and the sleeve 20 on the sheath 80.

When the tool 100 is in place in the yoke, the yoke parts 21 and 25 extend beyond the rear structure of the tool 100 as far as a shaping of the said structure that has recessed surfaces 112 with the concave side facing forwards, and against which claws 22, 23, 26, 27 of the said yoke parts 21 and 25 can bear and sit into the recesses of these surfaces 112.

In addition, a finger 390 of the brace 39 passes through a lug 251 of the yoke part 25 (see FIGS. 1 and 5) so that when the yoke is turned about the pole, the stand-off braces 36, 37, 38, 39 also turn about the pole and drive the hub 30 in this rotation, which hub then screws onto the sheath 80.

Likewise, the linkage 11 is driven in this rotation by lugs 211 and 212 (see FIG. 7) secured to the part 21 of the yoke. The result of this is that when clamping the tool 100 between the yoke and the stand-off braces, the tool, the parts 21 and 25 of the yoke, the stand-off braces 36, 37, 38, 39, the hub 30 and the linkage 11 remain secured together so that they rotate as one.

Finally, the linkage 11 comprises a piston 9 sliding in the end 82 of the sheath 80 and subjected to a return force exerted by a spring 83.

To fit the tool between the two parts 21 and 25 of the yoke, they need to be parted from one another transversely to the pole by causing their male 29 and female 28 soles to slide one in the other, the rear structure of the tool needs to be placed between their claws 22, 23, 26, 27 then these two parts need to be brought back together again in the reverse movement in order to bring their claws to face the surfaces 112.

To clamp the tool 100 between the claws of the yoke 22, 23, 26, 27 and the fingers 360, 370, 380, 390 of the stand-off braces 36, 37, 38, 39, it is turned about the pole 1 or the pole-securing sleeve 20 is screwed around the yoke and tool assembly. While this is being done, as this assembly rotates as one with the hub 30, the latter is screwed around the sheath 80. As the thread on the sheath and on the ring 31 is a left-hand thread, the fingers 360, 370, 380, 390 move away from the end 10 of the pole, and then, by pressing against the surfaces 110 of the rear structure of the tool 100, cause the tool itself to stand off from the pole, and press the surfaces 112 against the claws 22, 23, 26, 27 of the yoke. By an antagonistic effect due to the yoke, the soles 28, 29 exert a pulling action on the flange 84 of the sheath 80, and this secures them to the sheath 80, and therefore to the end 10 of the pole 1.

To operate the tool, the operating sleeve 12 is pulled downwards (if the tool has to be offered up upwards), and this compresses the spring 15 via the piston 14. The piston 15 pushes back and causes the pivoting of the wedge 13 into a securing position (181) securing the linkage 11. Thereafter, the linkage is pulled downwards and operates the trigger 101 of the tool via an end nib 111. At the same time, via the piston 9, the linkage 11 compresses the spring 83.

Once the tool has been operated, the operating sleeve 12 is released, the spring 83 pushes back the piston 9, and this has the effect of pulling the linkage 11 upwards (still assuming that the tool is being offered upwards), moving the end nib 111 away from the trigger 101 and detaching the said linkage from the operating sleeve 12 which, under the action of the spring 15, of the piston 14 and of the wedge 13, returns to its rest position, that is to say the position it had prior to operation.

The invention claimed is:

1. Pole for remote operation of a hand tool comprising:
   - a tool-securing device at one end of the pole,
   - a linkage for operating the tool,
   - a sleeve for operating the tool, configured to slide along the pole,
   - a securing arrangement which secures the operating sleeve to the linkage, at least one tubular element though which the linkage extends, and wherein the operating sleeve comprises a securing wedge that lies through a window formed in the tubular element and though which the linkage runs.

2. Pole according to claim 1, wherein the securing wedge lies through two opposed windows of the tubular element.

3. Pole according to claim 1, wherein the securing wedge is mounted to pivot on the operating sleeve under the action of a biasing device for returning this wedge to a wedging position on the linkage.

4. Pole according to claim 1, wherein the pole comprises at least two tubular elements which are telescopically slidable one inside the other, wherein the tool-securing device is provided on the inner tubular element, and wherein the operating sleeve is provided on the outer tubular element.

5. Pole according to claim 4, wherein it comprises sleeves for locking the relative position of the two tubular elements.

6. Pole according to claim 5, wherein a first locking sleeve is secured on the outer tubular element at one of its ends and runs along the inner tubular element to its other end, by screwing the first locking sleeve a wedging effect is produced with a second sleeve that is arranged around the inner tubular element and which is clamped against the inner tubular element thus holding the inner and outer tubular elements in position relative to one another.

7. Pole for remote operation of a hand tool comprising:

tool-securing device at one end of the pole, a linkage for operating the tool, a sleeve for operating the tool, configured to slide along the pole, and a securing arrangement which secures the operating sleeve to the linkage, wherein a securing end of the pole is tubular, a sheath to accommodate the linkage is inserted into the tubular end of the pole from one end, and a tool-securing sleeve is disposed on the tubular end of the pole, the tubular end of the pole, the sheath and the securing sleeve being secured together.

8. Pole according to claim 7, wherein the other end of the sheath is designed to collaborate with a hub secured to braces for standing the tool off in order, using a retaining yoke, to create an antagonistic effect on the said tool and thus immobilize it.

9. Pole according to claim 8, wherein the braces and yoke rotate synchronously.

10. Pole according to claim 8, wherein the yoke has retaining claws designed to sit into recessed surfaces of the tool.

11. Pole according to claim 8, wherein the yoke is made in two parts, one part comprising a female sole and the other part comprising a male sole, the two soles fitting and sliding in one another to allow the tool to be engaged in the yoke and to adjust the separation of the two parts to suit the tool.

12. Pole according to claim 8, wherein the braces are secured to the hub and wherein the tool is clamped by screwing the hub onto the sheath.

13. Pole according to claim 12, wherein a tapping and a thread of the hub and the sheath are respectively “left-hand” threads.

14. Pole according to claim 12, wherein the sheath has a flange against which, when the tool is clamped, the male and female soles are pulled and clamped to secure the two parts of the yoke to the sheath.

15. Pole according to claim 7, wherein the sheath comprises a stand-off spring to bias the linkage away from a trigger of the tool after the trigger has been operated.

* * * * *